Patented Dec. 27, 1932

1,892,480

UNITED STATES PATENT OFFICE

GÉRALD BONHÔTE, OF BASEL, SWITZERLAND, ASSIGNOR TO FIRM SOCIETY OF CHEMICAL INDUSTRY IN BASLE, OF BASEL, SWITZERLAND

AZO-DYESTUFFS

No Drawing. Application filed June 14, 1932, Serial No. 617,240, and in Switzerland July 1, 1931.

The present invention relates to the manufacture of new arylides of 2:3-hydroxynaphthoic acid which are particularly adapted for the production of fast tints on the fiber. It has been found that the hitherto not described products of the general formula

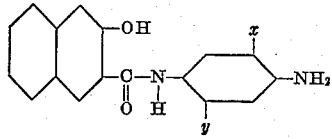

in which $x$ is an alkoxy-group and $y$ is an alkoxy-group or an alkyl-group, are remarkably suitable for the production of fast tints on the fiber. These products are characterized by a very good affinity for animal fibers. By treatment with nitrous acid and then with weak alkalies they are converted on the fiber into black pigments which are characterized by their outstanding properties of fastness, particularly fastness to light.

The process is particularly suitable for producing fast dyeings on textiles, for example on piece-goods, yarn, loose material, and also for printing.

The new products may be made advantageously by condensing 2:3-hydroxynaphthoic acid with a mono-acidylated diamine of the general formula

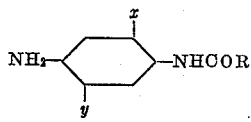

and subsequently saponifying the acidyl-group, or with a nitramine of the general formula

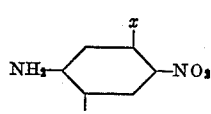

and subsequent reduction. In both the above formulæ $x$ and $y$ have the significance already given.

The following examples illustrate the invention, the parts being by weight:—

Example 1

60 parts of 2:3-hydroxynaphthoic acid, 60 parts of 1-amino-2-methyl-5-methoxy-4-acetylaminobenzene are stirred together with 600 parts of toluene at 80° C. In the course of 1 hour 25 parts of phosphorus trichloride are added by drops and then, while still stirring, the whole is boiled in a reflux apparatus until evolution of hydrogen chloride ceases. The fine suspension thus obtained is mixed with sodium carbonate until there is a feebly alkaline reaction and then the toluene is distilled with steam. After cooling the acetylated 2:3-hydroxynaphthoic acid arylide is dissolved in dilute caustic soda solution and reprecipitated.

150 parts of the moist material thus obtained are introduced into 600 parts of alcohol and 40 parts of sulfuric acid, and the whole is boiled in a reflux apparatus, while stirring, until a clear solution is produced. The alcohol is then distilled and the residue mixed with water. The crude saponified 2:3-hydroxynaphthoic acid arylide is filtered, re-dissolved in dilute caustic soda solution and reprecipitated, and if desired crystallized from alcohol. It is a white powder which dissolves to a yellow solution in alkalies and in sulfuric acid.

In like manner there may be used 1-amino-2-methyl-5-ethoxy-4-acetylamino-benzene, 1-amino-2:5-dimethoxy or diethoxy-4-acetylaminobenzene. If 1-amino-2-methyl-5-ethoxy-4-nitrobenzene is condensed with 2:3-hydroxynaphthoic acid, the product may be reduced in alcohol, preferably with iron and hydrochloric acid.

Example 2

18 parts of 2:3-hydroxynaphthoic acid-4-amino-2-methyl-5-methoxyanilide are dissolved at 40° C. in 450 parts of water, 5 parts of Turkey red oil and 10 parts of caustic soda solution of 40° Bé. There are then added 10 parts of sodium nitrite dissolved in 50 parts of water and the solution is made up to 1 litre with warm water.

A cotton fabric is treated in this liquid at 55° C. in the foulard machine and then wet or dry, for 3–5 minutes at room temperature in the following diazotizing bath:

40 parts of hydrochloric acid of 19° Bé.
960 parts of water.

The fabric is wrung out and developed, first at room temperature and afterwards at the boil, in a bath containing 20 parts of calcined sodium carbonate per litre, rinsed and then treated for 15 minutes in a boiling soap bath (5 grams of soap per litre). There is produced a pure black shade of good properties of fastness.

The dyeing process is similar when the products of Example 1 are used.

What I claim is:—

1. The compounds of the general formula in which $x$ is an alkoxy-group and $y$ is an alkoxy-group or an alkyl-group, which products are light powders which dissolve in caustic alkalies to a yellow solution, and which, when treated on the fiber with nitrous acid and then with alkalies, dye the same fast black tints.

2. The compounds of the general formula in which $x$ and $y$ are alkoxy-groups, which products are light powders which dissolve in caustic alkalies to a yellow solution, and which, when treated on the fiber with nitrous acid and then with alkalies, dye the same fast black tints.

3. The compounds of the general formula which products are light powders which dissolve in caustic alkalies to a yellow solution, and which when treated on the fiber with nitrous acid and then with alkalies, dye the same fast black tints.

4. The compounds of the general formula which products are light powders which dissolve in caustic alkalies to a yellow solution, and which, when treated on the fiber with nitrous acid and then with alkalies, dye the same fast black tints.

In witness whereof I have hereunto signed my name this 7th day of June, 1932.

GÉRALD BONHÔTE.